US011192277B2

(12) United States Patent
Yun

(10) Patent No.: US 11,192,277 B2
(45) Date of Patent: Dec. 7, 2021

(54) 3D CERAMIC PRINTER AND A METHOD USING THE SAME

(71) Applicant: Korea Institute of Machinery & Materials, Daejeon (KR)

(72) Inventor: Hui Suk Yun, Changwon-si (KR)

(73) Assignee: Korea Institute of Materials Science, Gyeongsangnam-do (KR)

( * ) Notice: Subject to any disclaimer, the term of this patent is extended or adjusted under 35 U.S.C. 154(b) by 833 days.

(21) Appl. No.: 15/857,959

(22) Filed: Dec. 29, 2017

(65) Prior Publication Data

US 2018/0117790 A1    May 3, 2018

Related U.S. Application Data

(63) Continuation-in-part of application No. PCT/KR2016/007736, filed on Jul. 15, 2016.

(30) Foreign Application Priority Data

Jul. 16, 2015 (KR) .......... 10-2015-0100924
Oct. 2, 2015 (KR) .......... 10-2015-0139339

(51) Int. Cl.
*B28B 1/00* (2006.01)
*B29C 64/20* (2017.01)
(Continued)

(52) U.S. Cl.
CPC ............ *B28B 1/001* (2013.01); *B29C 64/124* (2017.08); *B29C 64/20* (2017.08); *B29C 64/223* (2017.08);
(Continued)

(58) Field of Classification Search
None
See application file for complete search history.

(56) References Cited

U.S. PATENT DOCUMENTS 5,650,260 A     7/1997 Onishi
5,833,914 A *  11/1998 Kawaguchi .......... B29C 64/106
                                                         264/400

(Continued)

FOREIGN PATENT DOCUMENTS

CN        203622601 U     6/2014
CN        104191494 A    12/2014
(Continued)

OTHER PUBLICATIONS

International Search Report PCT/ISA/210 for International Application No. PCT/KR2016/007736 dated Oct. 17, 2016.
(Continued)

*Primary Examiner* — Monica A Huson
*Assistant Examiner* — Kelsey C Grace
(74) *Attorney, Agent, or Firm* — Harness, Dickey & Pierce, P.L.C.

(57) ABSTRACT

The present invention relates to a 3D printer wherein a printing material is placed and hardened on a transparent film and a 3D printing method using the same.

The 3D printer of the present invention is composed of the film supplying part to provide a transparent film; the material supplying part to provide a printing material on the transparent film; the photo-hardening part to solidify the printing material provided onto the transparent film as a designed form; and the film collecting part to collect the transparent film and the remaining printing material after the printing material has been hardened by the photo-hardening part.

12 Claims, 11 Drawing Sheets

(51) Int. Cl.
*B29C 64/124* (2017.01)
*B29C 64/223* (2017.01)
*B33Y 10/00* (2015.01)
*B33Y 30/00* (2015.01)
*B33Y 50/02* (2015.01)

(52) U.S. Cl.
CPC .............. *B33Y 10/00* (2014.12); *B33Y 30/00* (2014.12); *B33Y 50/02* (2014.12)

(56) References Cited

U.S. PATENT DOCUMENTS

| | | | |
|---|---|---|---|
| 6,336,014 B1* | 1/2002 | Sato | G03G 15/0817 399/103 |
| 8,003,040 B2 | 8/2011 | El-Siblani | |
| 8,845,316 B2 | 9/2014 | Schillen et al. | |
| 2003/0047133 A1 | 3/2003 | Lim et al. | |
| 2003/0194540 A1* | 10/2003 | Fusco | B32B 27/04 428/195.1 |
| 2004/0058260 A1* | 3/2004 | Katoh | G03G 9/09725 430/108.3 |
| 2006/0007254 A1* | 1/2006 | Tanno | B41J 2/175 347/7 |
| 2010/0092727 A1* | 4/2010 | Uchida | B29C 33/424 428/142 |
| 2013/0140741 A1 | 6/2013 | El-Siblani et al. | |

FOREIGN PATENT DOCUMENTS

| | | |
|---|---|---|
| JP | H08-072153 A | 3/1996 |
| KR | 10-2014-0140782 A | 12/2014 |
| KR | 10-2014-0146689 A | 12/2014 |

OTHER PUBLICATIONS

Written Opinion of the International Searching Authority PCT/ISA/237 for International Application No. PCT/KR2016/007736 dated Oct. 17, 2016.

* cited by examiner

3D CERAMIC PRINTER AND A METHOD USING THE SAME

CROSS-REFERENCE TO RELATED APPLICATIONS

This application is a continuation-in-part of, and claims the benefit of priority under 35 U.S.C. § 365(c) from, PCT International Application No. PCT/KR2016/007736 which has an International filing date of Jul. 15, 2016, which designates the United States of America, and further claims priority under 35 U.S.C. § 119 to Korean Patent Application No. 10-2015-0100924 filed on Jul. 16, 2015 and Korean Patent Application No. 10-2015-0139339 filed on Oct. 2, 2015, the entire contents of each of which are hereby incorporated by reference in their entirety.

TECHNICAL FIELD

The present invention relates to a 3D ceramic printer and a 3D printing method using the same. More precisely, the present invention relates to a 3D ceramic printer wherein a printing material is placed and hardened on a transparent film and a 3D printing method using the same.

BACKGROUND ART

In general, a 3D printer is understood as a device to realize a 3D shape of a printing material by the following steps; printing the material as flat as a 2D printer does and layering the 2D printed materials.

A 3D printer has been used to find out any problem in a future product in advance by making a copy of the product with chip and easy molded materials before the product is actually going to a market. Recently, a 3D printer is wanted in various fields because it can produce a 3D shape shortly based on the digitalized drawing information. In particular, a 3D printer has been used to produce precision parts and high strength ceramic.

To produce precision parts and high strength ceramic with a 3D printer, the photo-hardening system such as DLP and SLA is mainly used (see FIGS. 1A and 1B). However, both DLP and SLA are characterized by the following steps; loading a slurry or paste having ceramic powders dispersed in a photo-hardening agent to a printing bed or tank; handling the Z-axis stage down or up every time after loading the slurry or paste; and hardening the slurry or paste by radiating light to the same. According to the method above, as the filling ratio of inorganic materials goes up, the liquidity of the printing slurry or paste is reduced, suggesting that a flat layer is hard to be produced evenly. So, it is necessary to rake the printer surface with a blade or to rotate the vessel containing the slurry or paste.

Both cases use a printing tank containing a slurry or paste all together, and accordingly the filling ratio of inorganic materials increases with producing the following problems.

First, it is hard to produce a printing layer green body with an even thickness and a smooth surface.

Second, it is hard to regulate the thickness of each layer of the printing layer green body accurately.

Third, it is hard to accomplish the photo-hardening because of the light scattering caused by particles, which makes the radiation time longer and thereby the regulation of the thickness of each layer of the printing layer green body becomes difficult.

Fourth, there is a chance of partial hardening in an unwanted place because of the light scattering according to the prolonged radiation time or enlarged radiation dose, which causes the denaturation of a hardening solution, resulting in the problem of a final printing product.

Fifth, the printing speed gets slow down because all of the following steps take time: molding a printing layer; separating the molded stage; reproviding a slurry and a paste; and straightening the surface.

Sixth, a combination of different materials cannot be molded because only one kind of material can be used when a printing slurry or a paste bed is used.

Korean patent Publication No. 10-2014-0146689 describes the development of a hardening device using a ultraviolet light emitting diode designed and arranged for a variety of 3D printing processes. However, the development does not provide any method for 3D printing by providing a slurry or a paste in a proper thickness for layering, evenly and continuously onto a film, in order to provide a green body layer necessary for molding each layer, layer by layer.

Korean patent Publication No. 10-2014-0140782 describes a 3D printer and a method for 3D printing, wherein an area of light can be regulated by using a lens and a large area 3D shape can be printed by moving a reflective part or a printing part on a prepared stage. However, this invention is far from the method for 3D printing accomplished by providing evenly and continuously a slurry or a paste in a proper thickness for layering onto a film in order to provide a green body necessary for the molding of each layer, layer by layer.

PRIOR ART REFERENCE

Patent Reference (Patent Reference 1) Korean Patent Publication No. 10-2014-0146689

(Patent reference 2) Korean Patent Publication No. 10-2014-0140782

DISCLOSURE

Technical Problem

In order to overcome the problems of the conventional art, it is an object of the present invention to provide a 3D printer and a method for 3D printing using the same that can provide a slurry or a paste in a proper thickness for layering evenly and continuously, wherein a transparent film is used for the layering of a printing material that does not hinder the light transmission for photo-fabrication and can be easily separated after molding, so that a green body necessary for the molding can be provided each time.

Technical Solution

To achieve the object above, the present invention provides a 3D printer composed of the film supplying part to provide a transparent film; the material supplying part to provide a printing material on the transparent film; the photo-hardening part to solidify the printing material provided onto the transparent film as a designed form; and the film collecting part to collect the transparent film and the remaining printing material after the printing material has been hardened by the photo-hardening part.

The film supplying part herein is composed of at least one of roll elements for rolling of the transparent film, a motor to drive the roll element, and a height regulating element to regulate the height of the roll element.

Also, at least one of blades can be included in order to regulate the thickness of a printing material provided on the transparent film above.

The 3D printer of the present invention can additionally include a pair of cutters to regulate the width and the position of a printing material provided on the transparent film.

The material supplying part herein can include at least one of those syringe equipped with a mixing screw, an extrusion container equipped with a mixing stirrer, and a slurry feeder plate for the distribution of a printing material on the surface of the transparent film during the rotation of the transparent film rolled on the film supplying part.

The syringe type material supplying part includes a cylinder containing a printing material, a mixing screw equipped in the inside of the cylinder, an extruding syringe to extrude the printing material on the transparent film, and an oil hydraulic motor to regulate the up-down movement of the extruding syringe.

The extrusion container type material supplying part includes a case containing a printing material, a stirrer equipped in the inside of the case to stir the printing material, an outlet to discharge the printing material on the transparent film, and a pressure regulating motor to regulate the extrusion pressure.

A temperature regulating plate can also be included in order to maintain the temperature of a printing material regularly on a transparent film before the transparent film is provided in the photo-hardening part.

The photo-hardening part includes a light radiation unit, the first molding stage where the transparent film provided with a printing material is placed, and the second molding stage where the printing material is compressed onto the transparent film.

The 3D ceramic printer of the present invention can additionally include a ceramic molding plate having a 凹凸 pattern in 20 um~200 um depth that can be attached onto and detached from the bottom of the second molding stage.

The first molding stage includes a pressure reducing hole to maintain the transparent film flat and tight.

The first molding stage can also have a inclined plane or a slant groove for the easy separation of a hardened printing material from the transparent film.

The film collecting part includes at least one of collecting roll elements for the rolling of a transparent film and a motor to drive the collecting roll element.

The 3D printing method of the resent invention is composed of the following steps; providing a transparent film; providing a printing material on the transparent film; regulating the thickness of the provided printing material; hardening the printing material regulated with its thickness as a designed shape; and separating the hardened printing material from the transparent film.

The step of providing a printing material on the transparent film can also provide at least two different printing materials.

After the step of regulating the thickness of the provided printing material, a step of regulating the temperature of the printing material can be additionally included.

After the step of separating the hardened printing material from the transparent film, a step of collecting the remaining printing material and the transparent film can be additionally included.

Advantageous Effect

According to the 3D ceramic printer of the present invention and the method for 3D printing using the same, various materials including the ones with a high inorganic material filling ratio can be used; fine regulation of the layering thickness is possible; a sculpture can be formed layer by layer with even thickness; and thereby the failure rate of the final printing product (3D printing structure) can be lowered.

In addition, a molding time can be significantly reduced owing to the continuous providing of a printing material by the material supplying part in the course of the molding with the light-irradiation on the molding stage.

Also such problems of the method using the conventional material tank as the low precision caused by the undesirable strength or scattering of light, the hardening of slurry around, and the denaturation can be solved by the way of providing a material every time as much as needed.

According to the method of the present invention, it is also possible to provide a printing material every time on a new film, so that a structure providing various performances can be constructed with two or more materials provided by multiple providing devices.

When it is necessary to move a film in order to provide the film loaded with a new material after the molding, the remaining slurry after being contacted on the film by an angled blade can be recovered and recycled. The used film can be recovered and collected by using a film collecting roll.

According to the present invention, an embossed bumpy pattern is formed on the bottom of the ceramic molding plate, so that the binding force of a printed structure on the first stage is excellent and thereby the separation of the structure from the second stage can be prevented. At this time, upon completion of the printing, the printed structure desirably has the pattern depth as deep as easy to separate from the second stage. The ceramic molding plate is easy to attach on and separate from the second stage, indicating that washing or repair is easy.

The 3D ceramic printer of the present invention can minimize the waste of slurry by regulating the width of the printing material provided on a transparent film by using a cutter equipped in the printer along with a blade.

DESCRIPTION OF DRAWINGS

The application of the preferred embodiments of the present invention is best understood with reference to the accompanying drawings, wherein:

FIG. 1A relates to DLP type, and FIG. 1B relates to SLA type.

FIG. 5A is the syringe type, FIG. 5B is the extrusion container type and FIG. 5C is the slurry supplying plate type.

BEST MODE

Hereinafter, the examples of the present invention are illustrated in more detail with the diagrams attached herein. In those diagrams, same components are given the same reference marks even though they are presented in different diagrams. In the explanation of the present invention, the description on the composition or functions in association with the present invention that are clearly understood by those in the art but might obscure the point of the invention can be omitted.

Figure 1A:
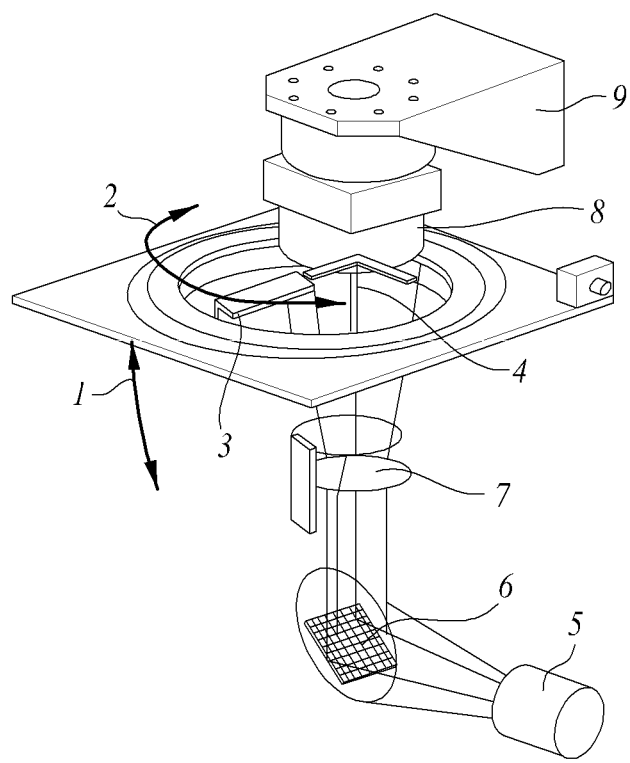
FIGS. 1A and 1B are a diagram illustrating the method for providing a material of the conventional 3D printer.
Figure 1B:
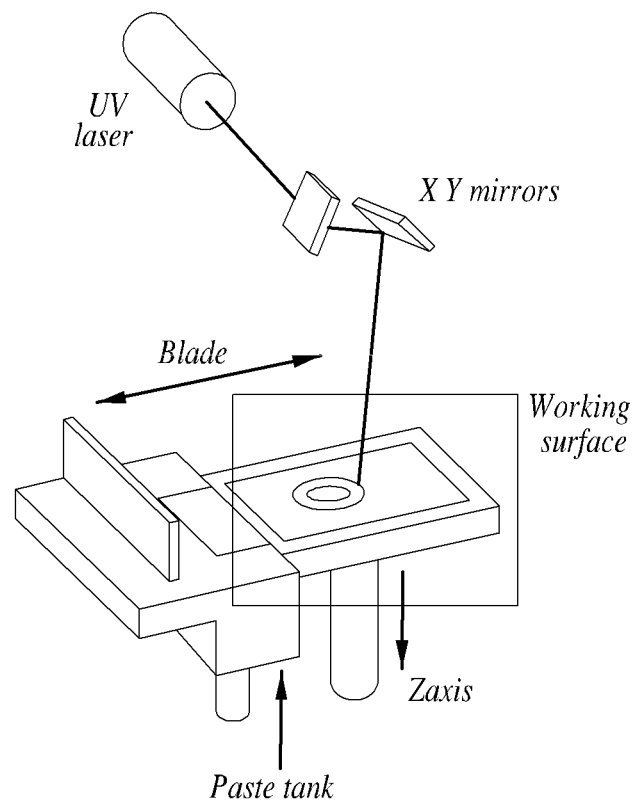
Figure 2:
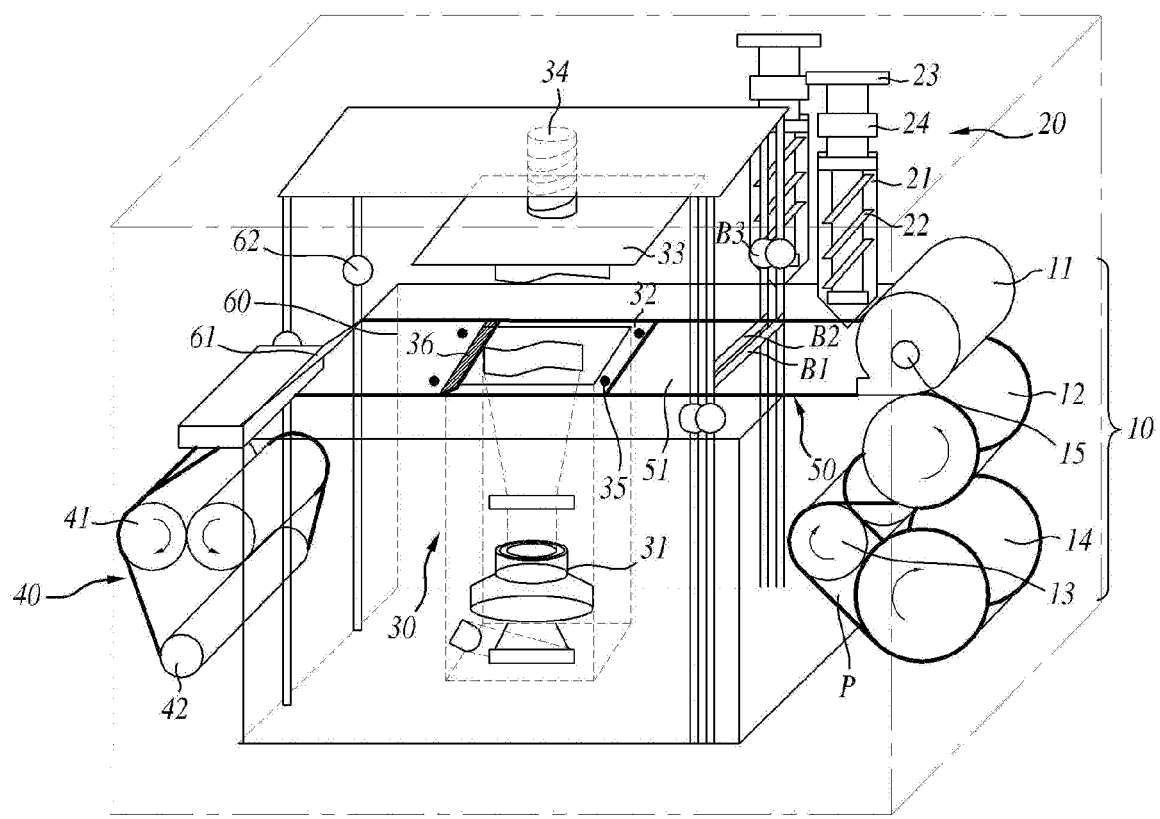
FIG. 2 is a diagram illustrating a 3D printer according to an example of the present invention.
Figure 3:
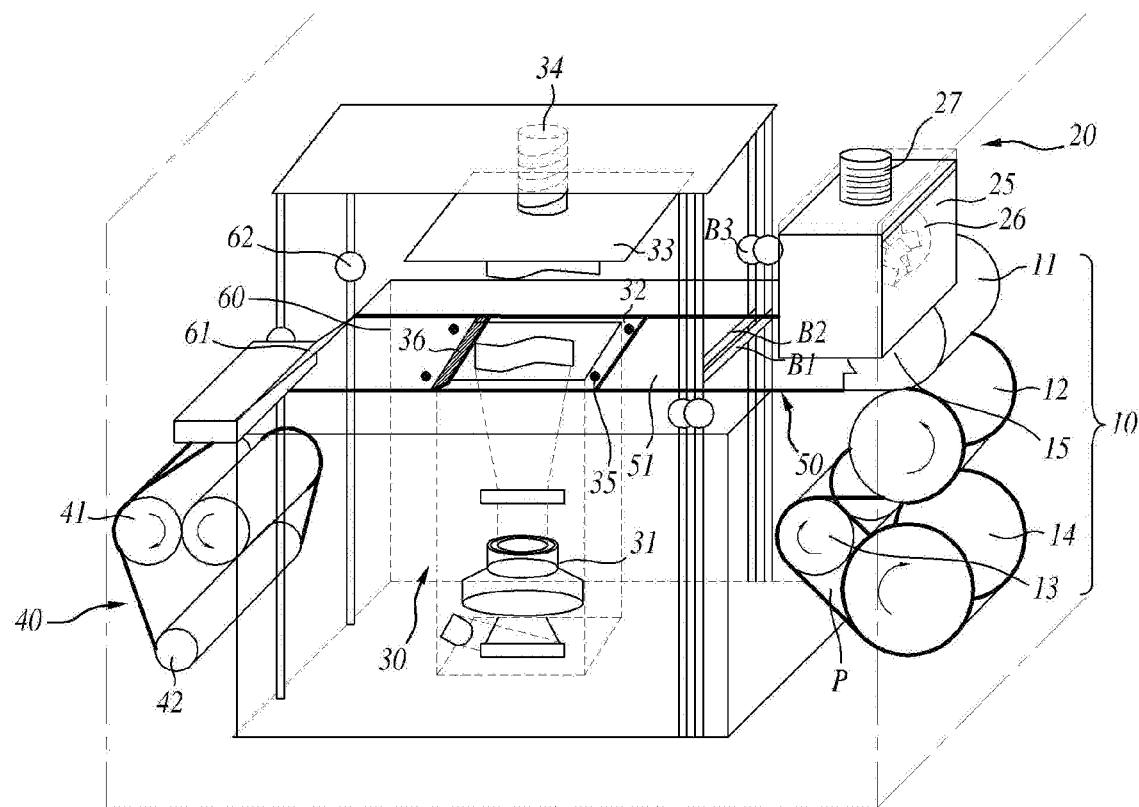
FIG. 3 is a diagram illustrating another 3D printer according to another example of the present invention.
Figure 4:
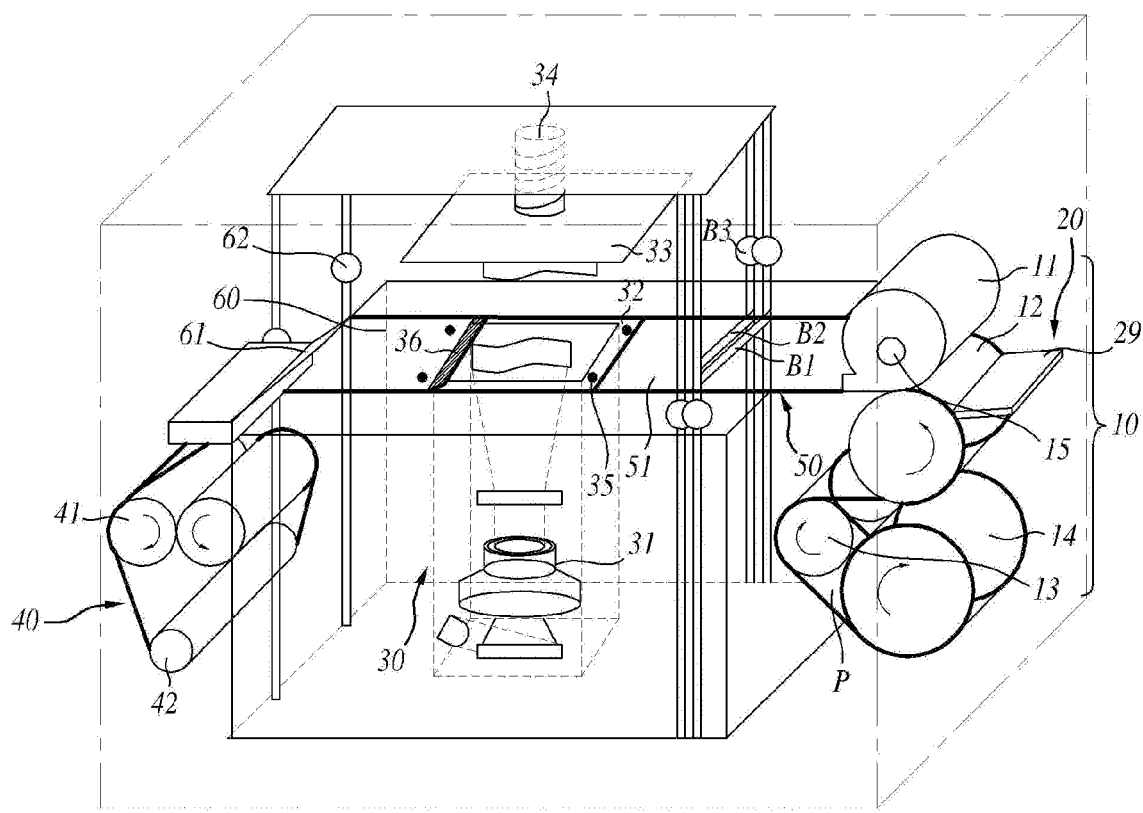
FIG. 4 is a diagram illustrating also a 3D printer according to another example of the present invention.
Figure 5A:
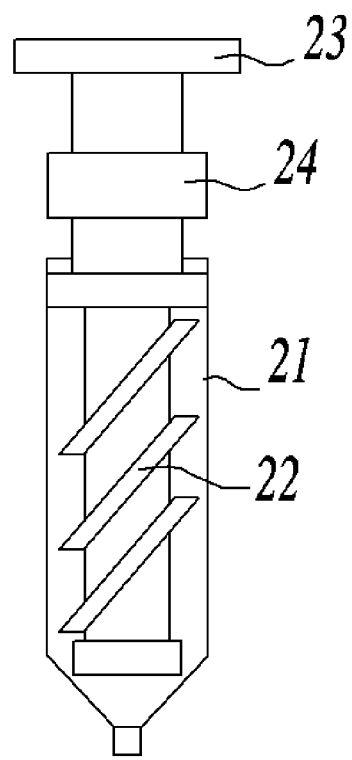
FIGS. 5A to 5C are diagrams illustrating the material supplying parts according to the examples of the present invention.
Figure 5B:
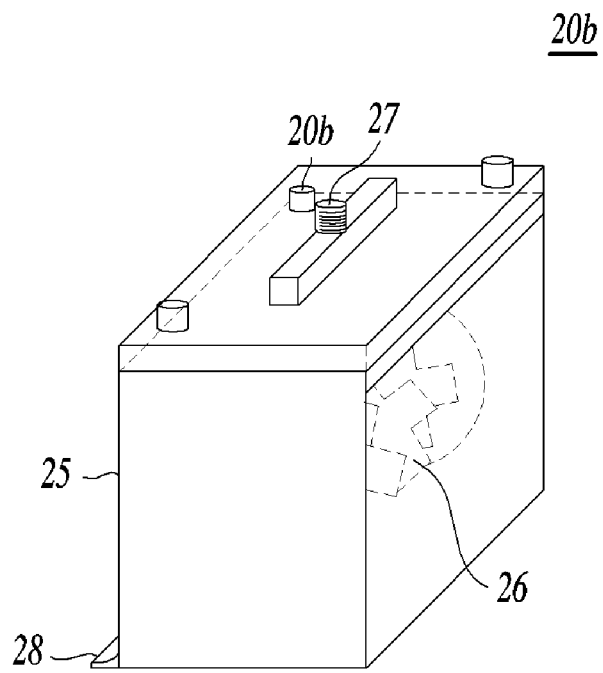
Figure 5C:
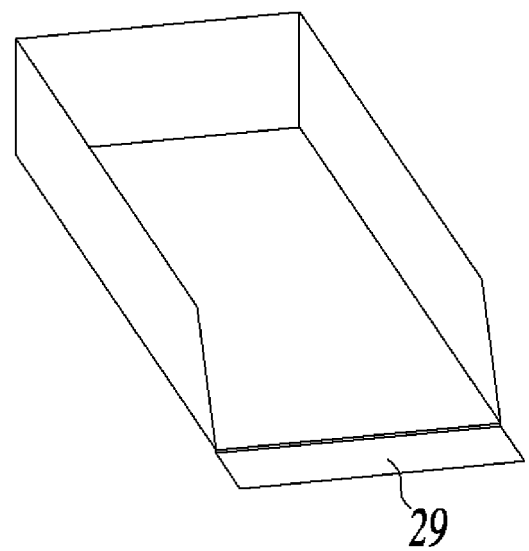

FIG. 2 is a diagram illustrating a 3D printer according to an example of the present invention, and FIG. 3 is a diagram illustrating another 3D printer according to another example of the present invention. FIG. 4 is also a 3D printer according to another example of the invention, and FIGS. 5A to 5C are a diagram illustrating the material supplying parts according to the examples of the present invention.

As shown in FIG. 2, the 3D printer according to an example of the invention is composed of the film supplying unit (10), the material supplying part (20), the photo-hardening part (30), and the film collecting part (40).

The film supplying part (10: 11~15) is composed of at least one of roll elements (11, 12, 13, and 14) for rolling of the transparent film (P) and a motor to drive the roll element (not shown). It also includes a height regulating element (15) to regulate the height of the roller element precisely. More specifically, the transparent film (P) placed on the film supplying unit (10) can be moved in a horizontal state by rotation of the motor (not shown). At this time, the height regulating element (15) can regulate a position in a height direction (z-axis) where the transparent film (P) is provided. In addition, the height regulating element (15) can regulate to maintain the heights of the motor (not shown) and the film supplying part (10) horizontally, by regulating the height of the motor (not shown). To achieve this, a plurality of height regulating elements (15) can be provided so as to independently regulate the heights of the motor (not shown) and the film supplying part (10).

The roll elements (11, 12, 13, and 14) play a role of maintaining the transparent film flat and even of providing the transparent film to the material supplying part (20). At this time, the height regulating element (15) regulates the height (z-axis) where the transparent film is provided.

The transparent film (P) above preferably has a low surface energy so that it embraces a printing material with a weak binding force on the film and let the film be apart easily after the molding. Such a transparent film is exemplified by polyethylene, teflon, silicon, and cellulose acetate, but not always limited thereto.

The material supplying part (20: 20a, 20b, 20c, see FIGS. 5A to 5C) provides a printing material on the transparent film (P) provided by the film supplying part (10). At this time, a preferable printing material is ceramic, but not always limited thereto.

The material supplying part (20), as shown in FIG. 2 and FIGS. 5A to 5C, is equipped with a cylinder (21) where a printing material such as slurry or paste is included; a mixing screw (22) placed in the cylinder to eliminate the air generated in the inside of the printing material and to prevent the contact with outside air; an extruding syringe (23) to extrude the printing material on the transparent film; and an oil hydraulic motor (24) to regulate the up-down movement of the extruding syringe, which is the syringe type material supplying part (20a). At this time, there can be one or more the syringe type material supplying parts (20a), which can shorten the molding time significantly by providing a printing material by continuous drive system.

In another preferred embodiment of the present invention, the material supplying part (20), as shown in FIG. 3 and FIGS. 5A to 5C, is composed of a case (25) where a printing material such as slurry or paste is loaded; a stirrer (26) to stir the printing material which is equipped in the inside of the case; an outlet (28) to discharge the printing material on the transparent film; and a pressure regulating motor (27) to regulate the extrusion pressure, which is the extrusion container type material supplying part (20b).

Also, the material supplying part (20) in another example of the invention, as shown in FIG. 4 and FIGS. 5A to 5C, can be formed as the slurry supplying plate type (20c) including the slurry supplying plate (29) installed closely to the rotating surface of a roll element so as to distribute a printing material evenly on the surface while the roll element is rotating.

The syringe type material supplying part shown in FIG. 2 is suitable for providing a printing material in a line on a transparent film, while the extrusion container type material supplying part shown in FIG. 3 is suitable for providing a printing material to fill the area as a face. The slurry supplying plate type material supplying part shown in FIG. 4 is suitable for providing a printing material to fill the area as a face. The slurry supplying plate type material supplying part does not need an additional stirring device, which favors making the printer structure simpler.

The material supplying part (20) provides a printing material on a transparent film with the regulation of the amount, the concentration, and the viscosity of a printing material. While the printing material is provided by the material supplying part (20), the transparent film is moved onto the first molding stage (32) by the first moving stage (50).

In a preferred embodiment of the present invention, the material supplying part (20) can include a mesh type filter in the outlet through which a printing material is sprayed. The mesh type filter is preferably made of such a material that does not react with the hardening solution and preferably lets the particles under 10 μm pass through. The material supplying part (20) can prevent the conglomeration of particles that can be formed by the polymerization of a molding solution when it is repeatedly re-used when the printing material is recycled.

In the meantime, the material supplying part (20) can include at least one of blades (B1 and B2) in order to regulate the thickness of the provided printing material. The first blade (B1) shown in FIG. 2 can make the printing material provided on the transparent film flat and the second blade (B2) can regulate the thickness of the printing material treated as flat above more precisely. And the height regulating element (B3) can also be included in order to regulate the height of such blades (B1 and B2).

While a transparent film is moving from the first moving stage (50) to the first molding stage (32), the heights of the first and the second blades (B1 and B2) are regulated by the height regulating element (B3), resulting in the regulation of the thickness of the transparent film. The two blades shown in the Figure are only examples and that does not mean the printer of the present invention is equipped with only two blades.

The first moving stage (50) is equipped with the temperature regulation plate (51) to maintain the temperature of a printing material on a transparent film stably before the transparent film provided with the printing material is provided to the photo-hardening part (30).

In the meantime, the first moving stage (50) can further be composed of the height regulating element (not shown) to regulate the height. Thereby, the first moving stage (50) can regulate the height of the provided transparent film (P). In particular, the first moving stage (50) can regulate the position in a height direction (z-axis) where the transparent film (P) is provided, and supply the same to the photo-hardening part (30). At this time, the height regulating element (not shown) can horizontally supply the film to the photo-hardening part (30) by regulating the height of the first moving stage (50). In addition, the first moving stage (50) can regulate the height independently from the photo-hardening part (30). Accordingly, the height of the first moving stage (50) can be regulated to easily receive the film from the film supplying unit (10), and can be re-regulated to the height to easily transport the film to the photo-hardening part (30).

The photo-hardening part (30) includes the light irradiation unit (31), the first molding stage (32), and the second molding stage (33).

On the first molding stage (32) is landed a transparent film provided with a printing material whose temperature has been maintained regularly by the temperature regulation plate (50).

The light irradiation unit (31) irradiates light onto the transparent film landed on the first molding stage (32). So, the first molding stage is preferably made of a transparent material in order for the light to reach the transparent film in the light irradiation unit (31).

The second molding stage (33) descends by the stage driving part (34) close to the printing material on the transparent film landed on the first molding stage (32). At this time, duration, light wavelength, and light intensity are controlled based on the stereolithography principles layer by layer and at last the printing material is hardened as programmed.

The first molding stage (32) has the pressure reducing hole (35) attached on a corner of it that helps the transparent film to contact the first molding stage (32) flat and tightly.

In the meantime, the first molding stage (32) can include an inclined plane (36) on one side for the easy separation of the printing material hardened by the second molding stage (33) from the transparent film.

In the meantime, the photo-hardening part (30) can regulate a hardening height of the transparent film (P) supplied from the first moving stage (50). In particular, the photo-hardening part (30) can be connected to the height regulating element (not shown) which can regulate the height independently from the first moving stage (50). Thereby, the photo-hardening part (30) can regulate the height independently from the first moving stage (50). The photo-hardening part (30) can improve the hardening efficiency of the printing material by regulating the height during hardening the film. In addition, the photo-hardening part (30) can transport the hardened film to the second moving stage (60). To achieve this, the photo-hardening part (30) can regulate the height independently from the second moving stage (60), allowing to easily transport the film by setting to an identical height as the second moving stage (60) after hardening.

The side of the first molding stage (32) where the inclined plane (36) is formed is connected with the second moving stage (60) and the transparent film has moved over the second moving stage (60) is collected by the film collecting part (40).

The film collecting part (40) is composed of at least one of the collecting roll elements (41) for rolling of the printed transparent film and a motor (not shown) to drive the collecting roll element (41). It can also include a weight (42) to give a certain pressure on the transparent film.

In the meantime, a printing material collecting container (61) might be formed in the end of the second moving stage (60). Also, a container height regulating element (62) can be included to regulate the height of the printing material collecting container. In addition, the printing material collecting container (61) can be connected to a part or an entirety of the container height regulating element (62), to regulate the height. In addition, the printing material collecting container (61) can move independently in a height direction in connection with the container height regulating element (62). Meanwhile, the printing material collecting container (61) needs to be capable of preventing damages, contaminations and the like of the 3D printing device when collecting the printing material.

In the meantime, the second moving stage (60) can further be composed of the height regulating element (not shown) to regulate the height. Thereby, the second moving stage (60) can regulate the height of the transparent film (P) transported from the photo-hardening part (30) after hardening. To achieve this, the second moving stage (60) can regulate the height independently from the photo-hardening part (30). Then, the second moving stage (60) can regulate the position in a height direction (z-axis) where the transparent film (P) is provided, and transport the same to the printing material collecting container (61). At this time, the height regulating element (not shown) can easily supply the film to the printing material collecting container (61) by regulating the height of the second moving stage (60). At this time, the second moving stage (60) and the printing material collecting container (61) can be maintained at the identical height or can be inclined. To achieve this, the second moving stage (60) can regulate the height independently from the printing material collecting container (61).

The printing material remaining on the transparent film without being hardened is collected by the printing material collecting container (61). The printing material collecting container (61) is equipped with a chisel board whose height can be adjusted, and the printing material remaining on the film is collected by the film collecting part (40) by contacting the chisel board tightly with the transparent film.

Figure 6:
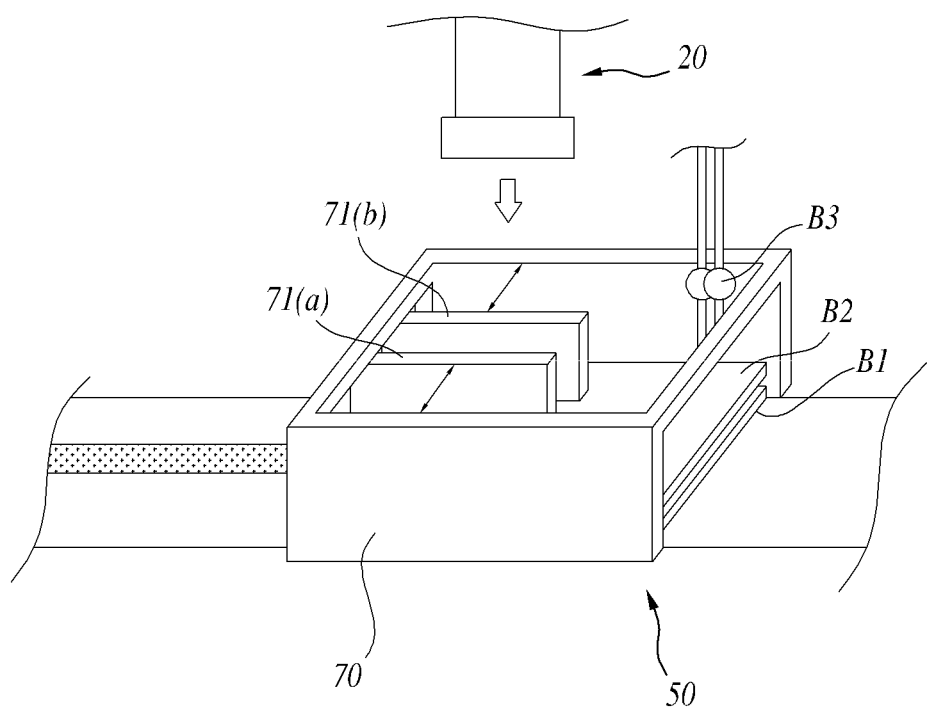
FIG. 6 is a diagram illustrating the set of cutters and blades according to an example of the present invention.

FIG. 6 is a diagram illustrating the set of cutters (71a and 71b) and blades (B1 and B2) according to an example of the present invention. As shown in FIG. 6, a package of the blades (B1 and B2) and the cutters (71a and 71b) can be equipped in the assembly line of the first moving stage (50).

The printing material can be sprayed all over the total area of a transparent film that would moved to the moving stage, according to a printing target, but also can be processed only on a part or a certain area of a transparent film if the size of a target is not so big. That is, the width or location of the distribution of the printing material can be regulated, by which the printing material waste would be significantly reduced by spraying the material only on a target area instead of spraying the material everywhere and also the material can be recycled.

FIG. 6 also illustrates an example of a set of cutters (71a and 71b) additionally equipped to regulate the width of the printing material that would be sprayed on a transparent film. As shown in FIG. 6, these cutters (71a and 71b) are included in a package composed of the blades (B1 and B2), the blade height regulating element (B3), and the cutters (71a and 71b), which are prepared in a case (70). As shown in FIG. 6, the material supplying part (20: 20a, 20b, and 20c) can spray a printing material from the top of the case (70) through a pair of cutters (71a and 71b). The material supplying part (20: 20a, 20b, and 20c) is designed to fit the inside structure of the case (70) to prevent the leaking of the printing material such as slurry.

A set of cutters (71a and 71b) are arranged in two parallel lines with some space on the first moving stage (50), which are included in the case (70) to slide toward the width direction of the transparent film. The material supplying part (20) sprays the printing material in the space between the first cutter (71a) and the second cutter (71b). Accordingly, the width of the printing material is regulated according to the interval of the cutters (71a and 71b). Likewise, the cutters (71 and 71b) slide toward the width direction of the transparent film to regulate the location of the printing material.

Figure 7:
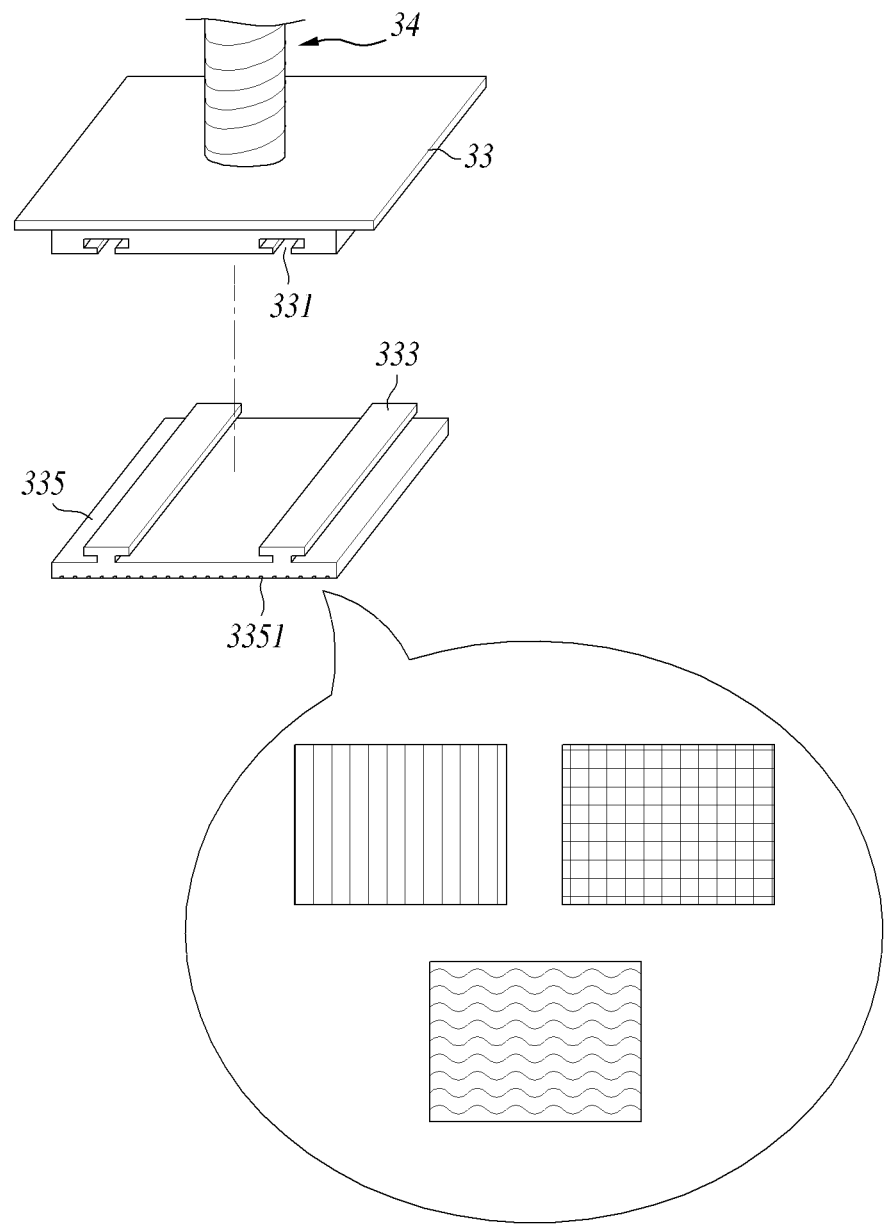
FIG. 7 is a diagram illustrating the molding plate according to an example of the present invention.

FIG. 7 is a diagram illustrating the molding plate (335) according to an example of the present invention. The molding plate (335) is to prevent the separation of the ceramic structure from the second molding stage (33) that might be happening in the course of the repeated attachment/separation of the film on the first molding stage (21) and the 3D ceramic structure shaped on the second molding stage and to prevent the impurities during the printing process.

The molding plate (335) is attached under the second molding stage (33) and is provided in the bumpy ceramic material having a 凹凸 pattern (3351) in the depth of 20 um~200 um that can be attached onto and detached from the bottom of the second molding stage. The molding plate (335) is designed to be easily attached on and separated from the second molding stage (33) for the maintenance and repair. In a preferred embodiment of the present invention, an engraved groove (331) is made on the lower surface of the second molding stage (33), while an embossed protrusion (333) is made with corresponding to the engraved groove (331) on the upper side of the molding plate.

According to an example of the present invention, a ceramic material is used as a printing material for the 3D ceramic printer of the invention. When ceramic is used as a raw material, a product is heavier than a product produced with a general light curing resin. So, the molding plate (335) made of the same ceramic material is favored for the prevention of the mixing with impurities and for the safe attachment of a sculpture. At this time, a 凹凸 pattern (3351) is formed on the lower surface of the molding plate (335) to increase the adhesiveness due to the widened area. The 凹凸 pattern (3351) can be provided in the shapes of line, lattice, and wave. The distance between grooves is preferably 1 mm~5 mm. If the depth of the groove in the 凹凸 pattern (3351) is too deep, the attached printing product is not separated. Therefore, the depth of the groove is preferably 20 um~200 um.

Figure 8:
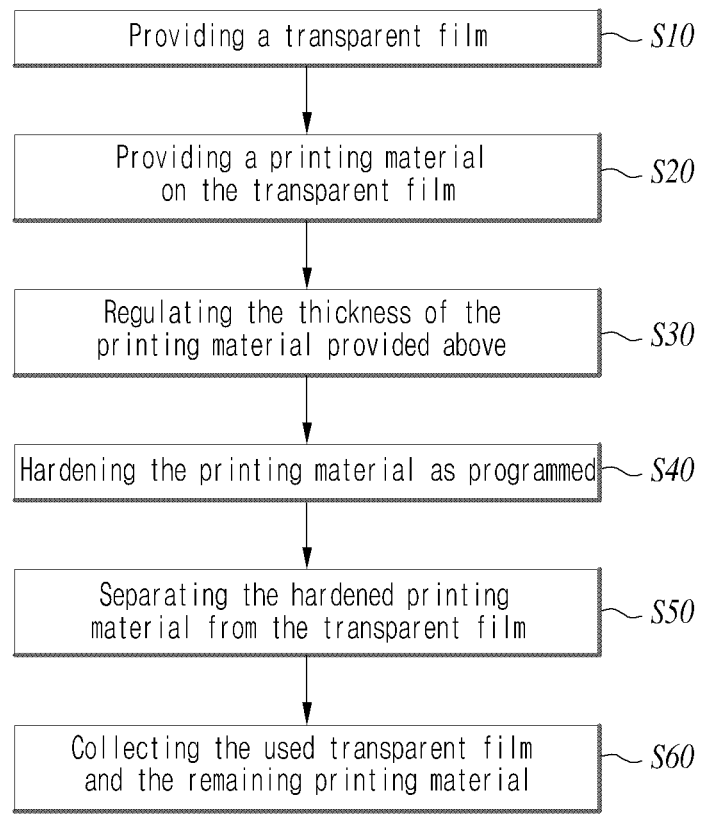
FIG. 8 is a flow chart illustrating the method of 3D printing according to an example of the present invention.

Next, the method for 3D printing of the present invention is described with referring to FIG. 8.

Overall, the film supplying part (10) provides a transparent film (P) and a printing material on the provided transparent film. The printing material is hardened as programmed in the first and the second molding stages (32 and 33). The used film and the remaining printing material are collected in the film collecting part (40). During the process, the transparent film is moved by the first and the second moving stages (50 and 60), for which a weight (42) is used to give force to the transparent film. This procedure is described in more detail hereinafter.

First, a transparent film is provided (S10).

The transparent film rolled on the roll element is provided to the first moving stage (50) by operating the motor equipped to drive the roll elements (11~14). More precisely, those roll elements (11~14) are designed to maintain the rolled transparent film flat and even and to provide the film to the material supplying part (20). At this time, the height and the direction (z-axis) of the provided transparent film can be adjusted by using a height regulating element (15).

Next, a printing material is provided on the transparent film (S20).

A printing material is projected or distributed on the transparent film provided in the first moving stage (50) by using at least one of many types of the material supplying part (20). At this time, in the step of providing the printing material, the amount, supply speed, concentration, and viscosity of the printing material can be regulated so that the printing material supplying time would be same as the time consumed for the step of photo-hardening (S40) which will be described hereinafter, by which the printing material supplying process and the printing material hardening process can be accomplished at the same time and as a result the whole production time for the final printing product will be effectively reduced.

Next, the thickness of the printing material provided on the transparent film is regulated (S30).

The thickness of the printing material can be regulated as wanted by adjusting the height of at least one of those blades (B1 and B2). If multiple blades are used, the height of each blade can be adjusted differently to achieve a more precise control of the thickness in each step.

More precisely, the printing material provided on the transparent film is being flattened primarily by the first blade (B1) and the thickness of the flattened printing material is precisely regulated by using the second blade (B2).

The height of the blades can be controlled according to the material supplying part (20) type. The regulation of the printing material thickness can be optimized and the temperature of the printing material can be optimized as well for the hardening simultaneously or before and after the thickness regulation.

Then, the printing material is hardened in the programmed shape (S40).

The transparent film on which the printing material is loaded with the regulation of its thickness is moved onto the first molding stage (32). The second molding stage (33) descends thereon to contact with the printing material. Time, light wavelength, and light intensity are regulated based on the stereolithography principles. The material is hardened layer by layer as programmed. At this time, the transparent film is contacted tightly and flat onto the first molding stage (32) through the pressure reducing hole (35) formed on the first molding stage (32).

The hardened printing material is adhered onto the second molding stage (33) to form a layer. The newly layered printing material on the first molding stage (32) is added to the hardened layer to form another layer.

Next, the hardened printing material is separated from the transparent film (S50).

Upon completion of the hardening, the transparent film is moved by the moving stages (50 and 60), followed by the separation of the hardened printing material from the transparent film. To make the separation smooth, the transparent film is pulled via pressure reduction by the pressure reducing hole (35). Or, the transparent film is let slide the inclined plane or the slant groove (36) formed on a side of the first molding stage (32) in order to separate the hardened printing material easily.

Next, the remaining printing material and the transparent film are collected (S60).

The used transparent film is collected by the collecting roll element (41) and the printing material that remained on the transparent film without being hardened is collected in the printing material collecting container (61).

The steps of S10~S60 are repeated, by which the hardened printing materials are accumulated layer by layer, resulting in the preparation of a 3D printing product as programmed. The collected remaining printing material and the transparent film can be recycled.

According to the 3D ceramic printer and the method for 3D printing of the present invention, the printing is processed at a certain sized transparent film unit, so a material for the printing is not limited and various materials can be processed in one device. It is also possible to control the thickness of layering very precisely and to form a sculpture in an even thickness layer by layer, suggesting that the failure rate of a final printing product (3D printing structure) is going to be lowered.

The printing material can be contacted with the transparent film tightly and such conditions as printing time, light wavelength, and light intensity can be regulated based on the stereolithography principles to harden the printing material layer by layer at an even thickness, according to the present invention. Therefore, the partial solidification or the hardening solution denaturation that is not wanted but induced by a longer irradiation time or a higher irradiation dose that causes light scattering can be prevented and instead the quality of the printing product remains good and regular. In the course of molding by light irradiation on the molding stage, the material supplying part is working in the way of continuous driving to provide a printing material, indicating that the molding time can be reduced significantly.

In addition, such problems as low precision degree, slurry solidification in the neighbor, and denaturation caused by the inadequate light intensity or scattering that are observed in the conventional method using the material tank can be solved because only a necessary amount of material for each layer is provided according to the present invention.

The printing material is provided every time on a new film so that a structure having a complicated structure can be produced by using two or more materials with the multiple supplying containers.

In the meantime, the remaining slurry left after the molding can be collected by using a blade contacting with the film at a certain angle and recycled before the film is moved in order to place a new film with a different material. The used film can be collected or recovered by using the film collecting roll.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

The invention claimed is:

1. A 3D ceramic printer comprising:
   a film supplying part configured to provide a transparent film;
   a material supplying part configured to provide a printing material on the transparent film;
   a photo-hardening part configured to solidify the printing material provided onto the transparent film as a designed form;
   at least one blade configured to regulate a thickness of the printing material on the transparent film;
   a first height regulating element configured to regulate a height of the blade; and
   a film collecting part configured to collect the transparent film and a remaining printing material after the printing material has been hardened by the photo-hardening part.

2. The 3D ceramic printer according to claim 1, wherein the film supplying part comprises:
   at least one roll element configured to roll the transparent film,
   a motor configured to drive the roll element, and
   a second height regulating element configured to regulate a height of the roll element.

3. The 3D ceramic printer according to claim 1, wherein the material supplying part includes at least one of a syringe with a mixing screw, an extrusion container with a mixing stirrer, or a slurry feeder plate configured to distribute the printing material on a surface of the transparent film when the transparent film is supplied by the film supplying part.

4. The 3D ceramic printer according to claim 3, wherein the material supplying part comprises the syringe, which includes a cylinder configured to contain the printing material, the mixing screw being inside the cylinder, an extruding syringe configured to extrude the printing material on the transparent film, and an oil hydraulic motor to configured to regulate an up-down movement of the extruding syringe.

5. The 3D ceramic printer according to claim 3, wherein the material supplying part comprises the extrusion container, which includes a case configured to contain the printing material, a stirrer being inside the case and configured to stir the printing material, an outlet configured to discharge the printing material on the transparent film, and a pressure regulating motor configured to regulate an extrusion pressure.

6. The 3D ceramic printer according to claim 1, further comprising:
   a temperature regulating plate configured to maintain a temperature of the printing material on the transparent film before the transparent film is provided into the photo-hardening part.

7. The 3D ceramic printer according to claim 1, wherein the photo-hardening part comprises a light radiation unit, first molding stage where the transparent film provided with the printing material is placed, and second molding stage where the printing material is compressed onto the transparent film.

8. The 3D ceramic printer according to claim 7, further comprising:
   a ceramic molding plate having embossed bumpy patterns in a depth of 20~200 um, the ceramic molding plate configured to separably attach to a lower surface of the second molding stage.

9. The 3D ceramic printer according to claim 7, wherein the first molding stage comprises a pressure reducing hole configured to ensure contact between the first molding stage and the transparent film.

10. The 3D ceramic printer according to claim 7, wherein the first molding stage comprises a inclined plane or a slant groove in one side to assist separation of a hardened printing material from the transparent film.

11. The 3D ceramic printer according to claim 1, wherein the film collecting part comprises:
   at least one collecting roll element configured to roll the transparent film; and
   a motor configured to drive the collecting roll element.

12. The 3D ceramic printer according to claim 1, further comprising: a set of cutters configured to regulate a width or a position of the printing material provided on the transparent film.

* * * * *